United States Patent
Al Madan

(10) Patent No.: US 12,540,543 B2
(45) Date of Patent: Feb. 3, 2026

(54) METHOD AND SYSTEM FOR PREDICTING FLOW RATE DATA USING MACHINE LEARNING

(71) Applicant: SAUDI ARABIAN OIL COMPANY, Dhahran (SA)

(72) Inventor: Mohammed H. Al Madan, Al Qatif (SA)

(73) Assignee: SAUDI ARABIAN OIL COMPANY, Dharhan (SA)

( * ) Notice: Subject to any disclaimer, the term of this patent is extended or adjusted under 35 U.S.C. 154(b) by 504 days.

(21) Appl. No.: 18/160,871

(22) Filed: Jan. 27, 2023

(65) Prior Publication Data
US 2024/0254875 A1    Aug. 1, 2024

(51) Int. Cl.
*E21B 47/07* (2012.01)
*G06N 3/08* (2023.01)

(52) U.S. Cl.
CPC .............. *E21B 47/07* (2020.05); *G06N 3/08* (2013.01); *E21B 2200/20* (2020.05); *E21B 2200/22* (2020.05)

(58) Field of Classification Search
CPC .. E21B 2200/20; E21B 2200/22; E21B 47/06; E21B 47/10
See application file for complete search history.

(56) References Cited

U.S. PATENT DOCUMENTS

| | | |
|---|---|---|
| 2007/0016389 A1 | 1/2007 | Ozgen |
| 2020/0320386 A1 | 10/2020 | Filippov et al. |
| 2020/0378239 A1 | 12/2020 | Jones et al. |
| 2021/0224682 A1* | 7/2021 | Al-Nasser .............. G01V 20/00 |
| 2021/0340896 A1 | 11/2021 | Albert et al. |
| 2021/0374521 A1* | 12/2021 | Albeshri ................. E21B 43/30 |
| 2022/0205354 A1* | 6/2022 | Chaki ..................... E21B 43/00 |
| 2023/0196089 A1* | 6/2023 | Liu ......................... E21B 49/00 706/12 |
| 2023/0221460 A1* | 7/2023 | Lin ......................... E21B 47/10 702/2 |
| 2024/0102835 A1* | 3/2024 | Jaaskelainen .......... E21B 47/10 |

FOREIGN PATENT DOCUMENTS

| | | |
|---|---|---|
| WO | 2018236238 A1 | 12/2018 |
| WO | 2022159567 A1 | 7/2022 |

* cited by examiner

*Primary Examiner* — Thomas M Hammond, III
(74) *Attorney, Agent, or Firm* — Osha Bergman Watanabe & Burton LLP

(57) ABSTRACT

A method may include obtaining acquired pressure data for various wells in a geological region of interest. The method may further include obtaining acquired pressure gradient data for the wells. The acquired pressured gradient data may correspond to a pressure difference based on vertical depth at one or more wells among the wells. The method may further include obtaining acquired temperature data regarding the wells. The method may further include determining predicted pressure data for a well in the geological region of interest using a first machine-learning model and the acquired pressure data. The method may further include determining predicted pressure gradient data for the well using a second machine-learning model and the acquired pressure gradient data. The method may further include determining predicted flow rate data for the well using a third machine-learning model, the predicted pressure data, the predicted pressure gradient data, and the acquired temperature data.

12 Claims, 10 Drawing Sheets

METHOD AND SYSTEM FOR PREDICTING FLOW RATE DATA USING MACHINE LEARNING

BACKGROUND

Multiphase flow data is a valuable metric for analyzing hydrocarbon production at a particular well as well as measuring the health of the well and the overall reservoir. However, collecting multiphase flow data often requires expensive testing equipment that may remove a well from a production operation as the well may need to be switched to a flow testing operation. Given the desire to keep wells in production, only limited times may be available for actual flow testing of a production well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining acquired pressure data for various wells in a geological region of interest. The method further includes obtaining acquired pressure gradient data for the wells. The acquired pressured gradient data corresponds to a pressure difference based on vertical depth at one or more wells among the wells. The method further includes obtaining acquired temperature data regarding the wells. The method further includes determining, by a computer processor, predicted pressure data for a well in the geological region of interest using a first machine-learning model and the acquired pressure data. The method further includes determining, by the computer processor, predicted pressure gradient data for the well using a second machine-learning model and the acquired pressure gradient data. The method further includes determining, by the computer processor, predicted flow rate data for the well using a third machine-learning model, the predicted pressure data, the predicted pressure gradient data, and the acquired temperature data. The method further includes transmitting, by the computer processor, a command to a control system based on the predicted flow rate data.

In general, in one aspect, embodiments relate to a system that includes a first well control system coupled to a first well, a second well control system coupled to a second well, a third well control system coupled to a third well, and a reservoir simulator that includes a computer processor. The reservoir simulator is coupled to the first well control system, the second well control system, and the third well control system. The reservoir simulator obtains acquired pressure data for the first well and the second well. The reservoir simulator obtains acquired pressure gradient data for the first well and the second well, wherein the acquired pressure gradient data corresponds to a first pressure difference based on vertical depth at the first well and a second pressure difference based on vertical depth at the second well. The reservoir simulator obtains acquired temperature data regarding the first well and the second well. The reservoir simulator determines predicted pressure data for the third well using a first machine-learning model and the acquired pressure data. The reservoir simulator determines predicted pressure gradient data for the third well using a second machine-learning model and the acquired pressure gradient data. The reservoir simulator determines predicted flow rate data for the first well using a third machine-learning model, the predicted pressure data, the predicted pressure gradient data, and the acquired temperature data.

In general, in one aspect, embodiments relate to a non-transitory computer readable medium storing instructions executable by a computer processor, the instructions when executed by the computer processor are configured to perform a method. The method includes obtaining acquired pressure data for various wells in a geological region of interest. The method further includes obtaining acquired pressure gradient data for the wells, wherein the acquired pressured gradient data corresponds to a pressure difference based on vertical depth at one or more wells among the wells. The method further includes obtaining acquired temperature data regarding the wells. The method further includes determining, by a computer processor, predicted pressure data for a well in the geological region of interest using a first machine-learning model and the acquired pressure data. The method further includes determining predicted pressure gradient data for the well using a second machine-learning model and the acquired pressure gradient data. The method further includes determining predicted flow rate data for the well using a third machine-learning model, the predicted pressure data, the predicted pressure gradient data, and the acquired temperature data. The method further includes transmitting a command to a control system based on the predicted flow rate data.

In some embodiments, the first machine-learning model is a first K-nearest neighbor (k-NN) model, the second machine-learning model is a second K-NN model, and the third machine-learning model is an artificial neural network. In some embodiments, the first machine-learning model is updated periodically using a first training operation based on second acquired pressure data. The second machine-learning model may be updated using a second training operation based on second acquired pressure gradient data. In some embodiments, training data are obtained that include acquired pressure data, acquired pressure gradient data, acquired temperature data. Acquired flow rate data may be obtained regarding the first well, wherein the acquired flow rate data may be acquired using a multiphase flowmeter. A training operation of the third machine-learning model may be performed using the training data and the acquired flow rate data to produce an updated machine-learning model. Second predicted flow rate data for a second well may be determined using the updated machine-learning model, predicted pressure data, predicted pressure gradient data, and acquired temperature data. In some embodiments, a time window for the first well is determined that corresponds to a predetermined period of time and a predetermined frequency. Acquired pressure data and acquired pressure gradient data may correspond to pressure data that is acquired by various pressure sensors during the predetermined period of time. An average value of the predicted flow rate data may be determined. A predicted multiphase flow parameter may be determined based on the average value. In some embodiments, one or more predicted multiphase flow parameters are determined for the first well using the predicted flow rate data. The one or more predicted multiphase flow parameters may be selected from a group consisting of a gas-to-oil ratio of production at the first well, water cut data for the first well, and a total flow rate of a well.

In some embodiments, the third machine-learning model is an artificial neural network that includes an input layer, various hidden layers, and an output layer. The input layer may obtain as inputs the acquired pressure data, acquired pressure gradient data, acquired temperature data, predicted pressure data, and predicted pressure gradient data. The output layer may output, at a respective time step, a total flow rate of the first well, a gas-oil ratio of the first well, and water cut data of a well. In some embodiments, various wells include a second well and a third well, wherein the second well includes a first wellhead coupled to a first temperature sensor, a first pressure sensor, and a first flow rate sensor, wherein the third well includes a second wellhead coupled to a second temperature sensor, a second pressure sensor, and a second flow rate sensor. A portion of acquired temperature data may be acquired by a first temperature sensor and a second temperature sensor, and wherein a portion of acquired pressure data is acquired by the first pressure sensor and the second pressure sensor. In some embodiments, acquired pressure data includes shut-in bottom hole pressure (SBHP) data. In some embodiments, acquired temperature data includes upstream temperature data that is acquired by a first temperature sensor for a flow before a choke assembly at a well and downstream temperature data that is acquired by a second temperature sensor for a flow at or after the choke assembly. In some embodiments, acquired pressure data includes upstream pressure data that is acquired by a first pressure sensor for a flow before a choke assembly at a well and downstream pressure data that is acquired by a second pressure sensor at or after the choke assembly at the well.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
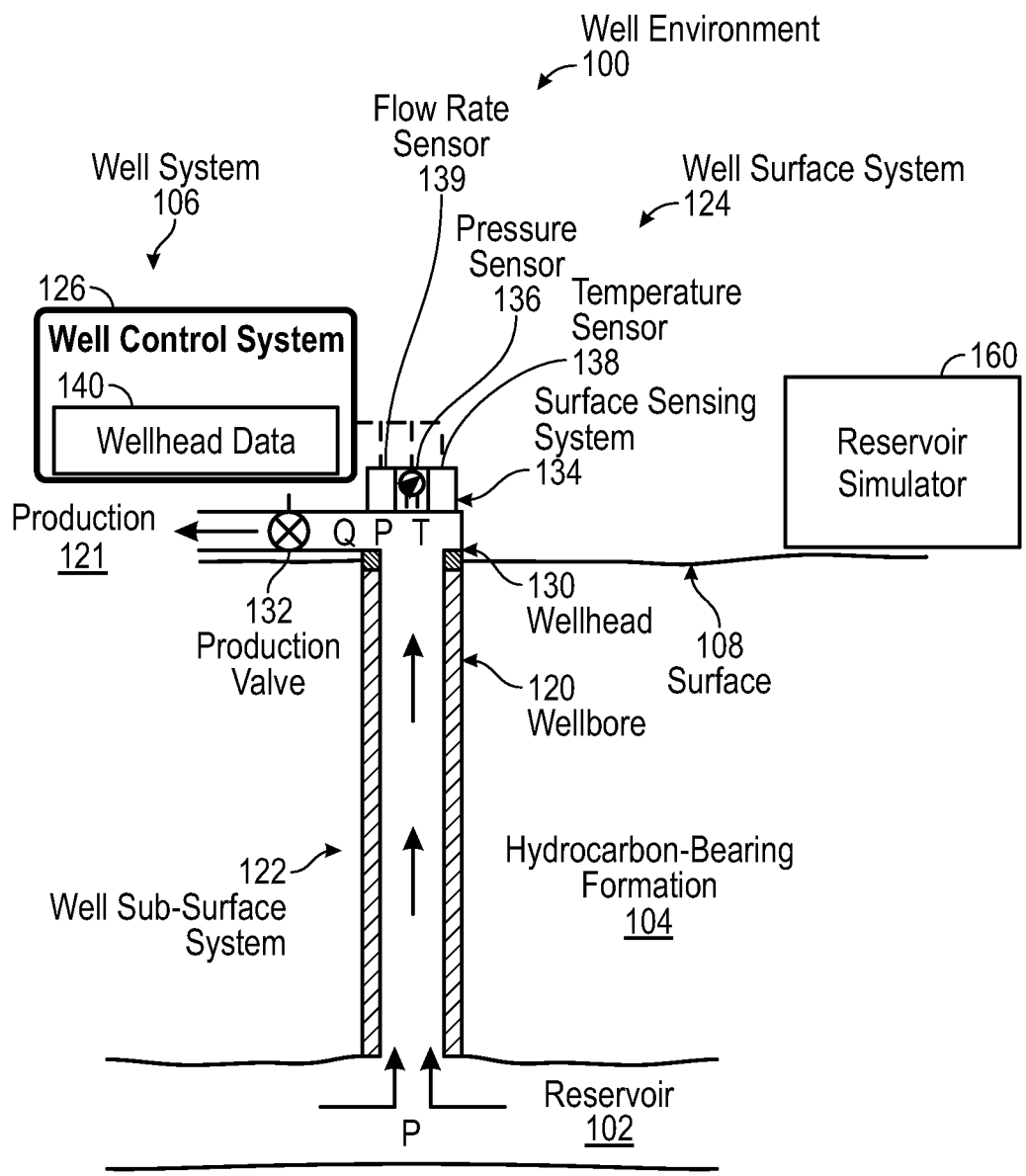
FIGS. 1, 2, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for predicting multiphase flow parameters for a target well using a hybrid machine-learning architecture. The target well may be an oil and/or gas well within a particular reservoir region that is producing hydrocarbons and/or lacks testing equipment, such as a multiphase flowmeter system. In particular, the hybrid machine-learning architecture may include multiple machine-learning models coupled together, such as two k-nearest neighbor (k-NN) models and an artificial neural network, that predict flow rate data for the target well. More specifically, upstream data may correspond to a flow before a choke assembly on a well, such as before the wellhead (e.g., upstream pressure data may correspond to wellhead pressure data and upstream temperature data may correspond to wellhead temperature data).

In some embodiments, one k-NN model determines predicted pressure data for the target well using upstream and downstream pressure data acquired from sensors for one or more wells. Likewise, another k-NN model may determine predicted pressure gradient data for the target well using acquired pressure gradient data based on sensors for both upstream and downstream data. After training both k-NN models to predict data for the target well, an artificial neural network may be trained that uses acquired pressure data from other wells, acquired temperature data from other wells, acquired pressure gradient data from other wells, predicted pressure data for the target well, and predicted pressure gradient data for the target well. Based on these different data inputs, the artificial neural network may determine predicted flow rate data for the target well. From this predicted flow rate data, various predicted multiphase flow parameters may be determined accordingly, such as total flow rate, water cut (WC) values, and a gas-oil ratio (GOR) of the target well.

In some embodiments, a time window is used to prepare acquired data for input to the hybrid machine-learning architecture. To predict flow rate data at the target well, relevant time series data may be collected based on the time window. In order words, real-time predictions at a target well may require a simultaneous or near simultaneous collection of acquired data at different locations around a reservoir region. Thus, the time window may specify a particular period of time for data acquisition, such as a particular day, week, or month, that defines the starting time and the ending time for collecting well data throughout a reservoir region for inputs to the hybrid machine-learning architecture. In some embodiments, output flow rate values from an artificial neural network may be averaged (e.g., to obtain a mean value) over the acquisition time window in order to obtain a smoother flow rate signal and better estimates of predicted flow rate data for the target well.

Furthermore, some embodiments provide real-time flow rate testing that may not be available for one or more target wells during respective production operations. Thus, the hybrid machine-learning architecture may provide real-time insights regarding the multiphase flow of various target wells using pressure and temperature data sources in the same reservoir region. Thus, some embodiments may access frequently collected data throughout the reservoir region, such as data from shut-in wells, to provide an alternative technological solution to standard flow testing with flow rate test equipment, such as multiphase flow meters. By using upstream and downstream well data sources, real-time flow information may be obtained for an operating production well, such as information on changing flow rates for different wells caused by changes in the underlying reservoir region. For example, changes in a reservoir's flow network may result in switching flowline at a target well. Opening or closing wells on the same flow network may also affect the target well's multiphase flow parameters.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying properties, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The control system (126) may control various operations of the well system (106), such as well production operations, well completion operations, well maintenance operations, and reservoir monitoring, assessment and development operations. Control systems may include a programmable logic controller (PLC), a distributed control system (DCS), a supervisory control and data acquisition (SCADA), and/or a remote terminal unit (RTU). For example, a programmable logic controller may control valve states, fluid levels, pipe pressures, warning alarms, and/or pressure releases throughout a well facility or power-generation facility. In particular, a programmable logic controller may be a ruggedized computer system with functionality to withstand vibrations, extreme temperatures, wet conditions, and/or dusty conditions, for example, around a refinery. A distributed control system may be a computer system for managing various processes at various facilities using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system. Likewise, a control system may be coupled to one or more well devices.

In some embodiments, a well control system includes functionality for transmitting commands to another control system to implement a particular production operation or stimulation operation. For example, a well control system coupled to a reservoir simulator may transmit a network message over a machine-to-machine protocol to a control system based on predicted flow rate data. A command may be transmitted based on a user input or automatically based on changes in production conditions, e.g., after analyzing new reservoir data, electric-power data, and carbon emission data. In some embodiments, the control system (126) includes a computer system that is the same as or similar to that of computer system (702) described below in FIG. 7 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "uphole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "uphole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (702) described below with regard to FIG. 7 and the accompanying description.

In some embodiments, production wells and/or injection wells are used in one or more stimulation operations. For example, one type of stimulation operation is a water-alternating-gas (WAG) operation. A WAG operation may be a cyclic process of injecting water followed by gas. Using a WAG injection, macroscopic or microscopic sweep efficiency may be improved for a reservoir, e.g., by maintaining nearly initial high pressure, slow down any gas breakthroughs, and reduce oil viscosity. Likewise, WAG injections may also decrease residual oil saturation resulting from three phase flows and effects associated with relative permeability hysteresis. Thus, some stimulation operations may produce gas flooding, which is a type of enhanced oil recovery (EOR) method for increasing recovery of light to moderate oil reservoirs. In some stimulation operations, water may be injected during the initial phase of the operation and followed by a gas (e.g., carbon dioxide) because water may have a higher mobility ratio than the injected gas, thereby preventing breakthroughs in the reservoir. Injected gas may be a mixture of hydrocarbon gas or nonhydrocarbon gases. With hydrocarbon gases, the gas mixture may include methane, ethane, and propane for achieving a miscible or immiscible gas-oil system in the reservoir. With nonhydrocarbon gases, the gas mixture may include carbon dioxide ($CO_2$), nitrogen ($N_2$), and some exotic gases that displace fluid in the reservoir. Likewise, gas may also be injected directly into a reservoir, e.g., into the gas cap, to compensate for the reservoir's pressure decline.

Furthermore, a stimulation injection during a stimulation operation may correspond to various injection parameters, such as bank size, cycle time, and a predetermined water-gas ratio (also called a "WAG ratio"). Bank size may refer to a size of sequential banks of fluids (e.g., oil, $CO_2$ and water) formed in the reservoir rock in response to a stimulation operation that migrate from the injection to the production wells. For illustration, a WAG ratio of 1:1 may result in a high oil production for one or more production wells, such as production wells coupled to a miscible reservoir. Based on some reservoir parameters such as oil composition, gas flooding can be carried out in miscible or immiscible conditions. Moreover, different types of stimulation operations may use different stimulation parameters. Examples of different stimulation operations may include: (1) continuous gas injections; (2) WAG injections; (3) simultaneous water-alternating-gas (SWAG) injections; and (4) tapered WAG injections. Different strategies have been developed by the petroleum industry to cope with these conditions.

Figure 2:
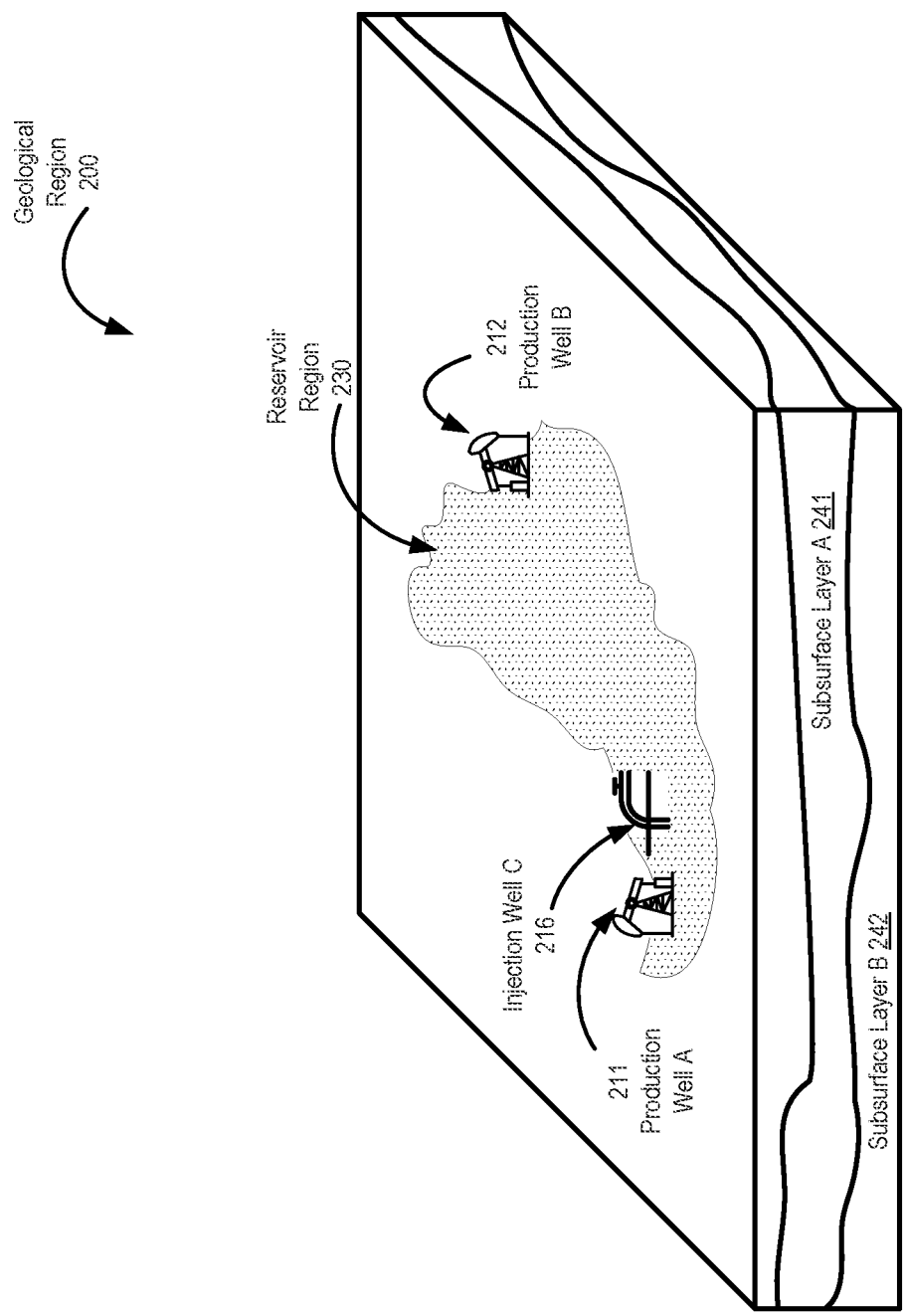

Turning to FIG. 2, FIG. 2 shows a schematic diagram in accordance with one or more embodiments. As illustrated in FIG. 2, FIG. 2 shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (140) described in FIG. 1 and the accompanying description.

Returning to FIG. 1, a reservoir simulator (e.g., reservoir simulator (160)) may include hardware and/or software with functionality for generating and/or updating one or more machine-learning models to determine predicted flow rate data and/or predicted multiphase flow parameters. Examples of machine-learning models may include artificial neural networks, such as convolutional neural networks, deep neural networks, and recurrent neural networks. Machine-learning models may also include support vector machines, decision trees, random forests, inductive learning models, deductive learning models, supervised learning models, unsupervised learning models, reinforcement learning models, etc. In a deep neural network, for example, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network. In some embodiments, two or more different types of machine-learning models are integrated into a single machine-learning architecture, e.g., a machine-learning model may include K-nearest neighbor (k-NN) models and neural networks. In some embodiments, a reservoir simulator may generate augmented data or synthetic data to produce a large amount of interpreted data for training a particular model.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of temperature values or flow rate values), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a reservoir simulator uses multiple K-nearest neighbor models to predict data (e.g., pressure data and/or pressure gradient data). For example, a K-nearest neighbor (k-NN) model may be an algorithmic model based on a non-parametric classification algorithm or a regression algorithm. Thus, the algorithm's inputs may include the k closest training examples within a feature set, while the algorithm's output may depend on whether the k-NN algorithm is used for classification or regression. For a k-NN classification example, the output may be one or more predetermined class types. In other words, an object may be classified by a plurality vote of multiple neighbor nodes, with the object being assigned to the class most common (e.g., in greatest proximity) among its k nearest neighbor nodes. If there is only a single nearest neighbor node, then the object may be simply assigned to the corresponding class of that single nearest neighbor. In a k-NN regression example, the output may be the property value for the object. As such, this property value may be the average of the values of k nearest neighbor nodes.

In some embodiments, various types of machine learning algorithms may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

In some embodiments, a reservoir simulator uses one or more ensemble learning methods to produce a hybrid-model architecture. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Figure 3:
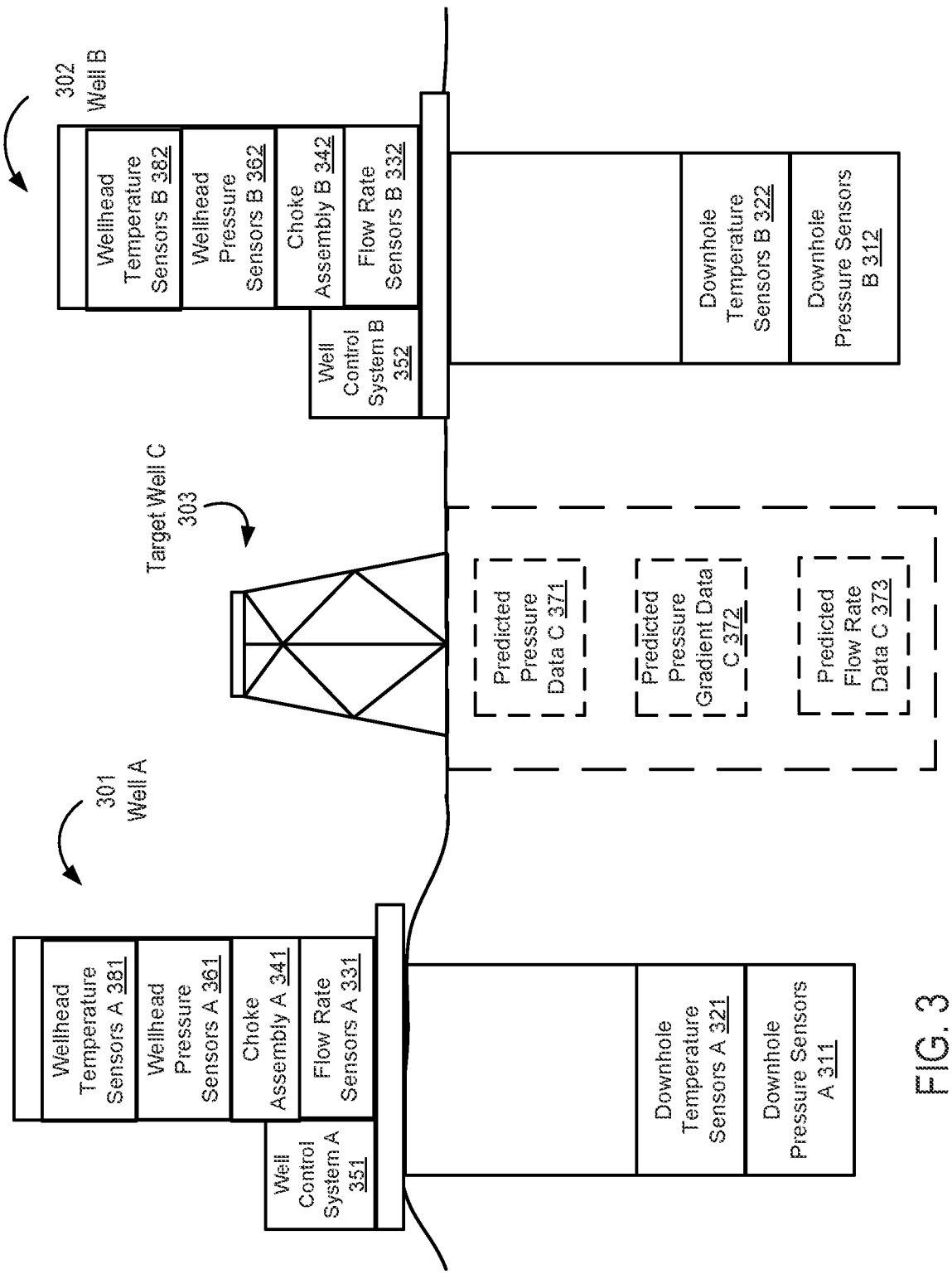

Turning to FIG. 3, FIG. 3 shows a target well (e.g., target well C (303)) for predicting data and various wells in accordance with one or more embodiments. In FIG. 3, a well control system (e.g., well control system A (351), well control system B (352)) may collect data regarding various wells (e.g., well A (301)), well B (302)). The well control systems (351, 352) may be coupled to well equipment (e.g., choke assembly A (341), choke assembly B (342)), such as flow testing equipment. For example, various flowrate sensors (e.g., flow rate sensors A (331), flow rate sensors B (332)), various pressure sensors (e.g., wellhead pressure sensors A (361), wellhead pressure sensors B (362), downhole pressure sensors A (311), downhole pressure sensors B (312)), and/or temperature sensors (e.g., wellhead temperature sensors A (381), wellhead temperature sensors B (382), downhole temperature sensors A (321), downhole temperature sensors B (322))) may acquire sensor data regarding various well parameters in a reservoir region.

A reservoir simulator may obtain acquired data to determine predicted data for a target well, such as a production well that is being used for production and lacks testing equipment for flow rate testing. In some embodiments, for example, the reservoir simulator may use acquired data and one or more machine-learning models to determine predicted pressure data (e.g., predicted pressure data C (371)), predicted pressure gradient data (e.g., predicted pressure gradient data C (372)), and predicted flow rate data (e.g., predicted flow rate data C (373)).

In some embodiments, downhole pressure sensors include absolute pressure transmitters, differential-pressure transmitters, and/or multivariable transmitters. Absolute pressure transmitters may include sensors that measure pressure with respect to a full vacuum, while differential-pressure transmitters may include sensors that are used in flow applications. Multivariable transmitters may measure pressure in addition to other variables, such as temperature. For example, a multivariable transmitter may be a gauge sensor that measures both pressure and temperature at a single point, such as a single quartz crystal. Multivariable transmitters may be transmit-only devices in a well providing pressure and temperature (PT) measurements at fixed time intervals, e.g., using one or more electric lines and one or more hydraulic lines. Likewise, multivariable transmitters may transmit pressure and temperature data to a well surface using a high-speed digital telemetry link. Similar to downhole pressure sensors, downhole temperature sensors may include downhole temperature gauges, temperature transmitters, and/or multivariable transmitters. In some embodiments, permanent downhole gauges (PDGs) are used that are permanently installed in a well and used to detect pressure data and/or temperature data.

In some embodiments, a flow rate sensor is a multiphase flow meter. For example, a multiphase flow meter may include hardware and/or software for determining individual flow rates of different components within a three-phase flow. More specifically, a multiphase flow meter may determine a mass flow rate of a gas component and a mass flow rate of a liquid component (e.g., a component of the three-phase flow that includes oil and water) of the three-phase flow. As such, a multiphase flow meter may be used to determine an amount of oil or a portion of oil within a multiphase flow that travels through a wellhead during a given period of time. A multiphase flow meter may also include hardware that uses various types of sensors based on different sensing technologies (e.g., nuclear magnetic resonance, electromagnetic sensors, acoustic sensors, etc.) and interpretation models. For example, a multiphase flow meter may use a sensor response of magnetic resonance information to determine the number of hydrogen atoms in a particular fluid flow. Since oil, gas, and water each contain hydrogen atoms, properties of a multiphase flow may be measured using magnetic resonance. The hydrogen atoms in a magnetized fluid may respond to radio frequency pulses and emit echoes that are subsequently recorded and analyzed by the multiphase flow meter. Thus, multiphase flow rate measurements may be used for production monitoring, well control, and/or reservoir optimization.

Moreover, a multiphase flow metering system may include a multiphase flow meter and a host device. In response to determining flow rate data regarding a multiphase flow, a multiphase flow meter may transmit flow rate data to a host device, such as a well control system or another type of computer system, over a network. The multiphase flow meter may be coupled to one or more flow tubes in order to determine the flow rate data, such as individual flow rates and/or oil, gas, and/or water fractions of a corresponding multiphase flow. A flow tube may be a fluid conduit, such as pipe, that may provide a fluid sampling for analysis by the multiphase flow meter. Examples of flow tubes may include a bent flow tube, a straight flow tube, or another type of flow tube. Furthermore, a flow model may be stored within a multiphase flow meter as a portion of a database and/or as one or more flow regime maps that are associated with various sensor values. By analyzing sensor data in connection with one or more flow models, a flow meter may determine flow rate data that corresponds to acquired sensor data. Flow rate data may include corresponding fractional data (e.g., gas fraction of a multiphase flow) and/or velocity data (e.g., an individual flow rate of oil or water in the multiphase flow).

Furthermore, the multiphase flow meter may include a flow meter controller that controls sensing operations and/or the flow analysis operations. In some embodiments, a flow controller uses one or more flow models to determine flow rate data regarding a particular flow. Phase distribution information may describe the respective fractions of one or more phases (e.g., gas phase, oil phase, water phase), in a particular flow. Flow regime information may refer to a specific manner that two or three phases flow through a flow tube. For example, a flow regime may be expressed using various superficial velocities. One example of a flow regime may be a "bubble regime," in which gas is entrained as bubbles within a liquid. Another example of a flow regime is a "slug regime" that may correspond to a series of liquid "slugs" or "plugs" separated by relatively large gas pockets. Accordingly, flow model may describe changes in a multiphase flow between transitions from high-liquid compositions to high-gas compositions and vice versa. Other flow regimes may include an annular flow regime, a dispersed flow regime, and a froth flow regime.

A multiphase flow meter may also include various types of sensors (e.g., differential pressure sensors, impedance sensors, absolute pressure sensors, temperature sensors, etc.) to determine various fluid properties, such as a volume fraction of liquid in the flow tube (i.e., to implement a liquid fraction sensor), and/or a void fraction value that corresponds to a percentage of a material in the flow tube that is in gaseous form (i.e. to implement a void fraction sensor). As such, various flow composition techniques may be used, such as based on gamma ray sensing or x-ray sensing. In gamma ray sensing, a liquid flow rate may be determined from a liquid film thickness and a pressure gradient (dp/dz)

along a straight tube section of a flow tube. The liquid film thickness may be determined using gamma ray densitometry, conductance sensor measurements, capacitance sensor measurements, acoustic sensor measurements, and/or fluorescent sensor measurements to determine the liquid film thickness, depending on the multiphase flow metering system. With respect to gamma ray sensing, a gamma ray sensor may include a gamma ray source and a gamma ray detector for determining a fluid composition of a specific flow. The attenuation of photons along a narrow beam path between the gamma ray source and the gamma ray detector may be dependent on the energy of the photons, which may describe the atomic composition of the flow and other fluid properties, such as density. Thus, a multiphase flow meter may use one or more of the following sensors: motion sensors for measuring the fluid velocity within a flow tube, density sensors for acquiring density measurements of a material flowing through the flow tube, temperature sensors for measuring the temperature in the flow tube, and/or pressure sensors for sensing one or more pressures of a material flowing through the flow tube. In some embodiments, a multiphase flow meter may use pressure-volume-temperature (PVT) modeling in place of or in addition to gamma ray sensing to determine one or more fluid properties.

While FIGS. 1, 2, and 3 show various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
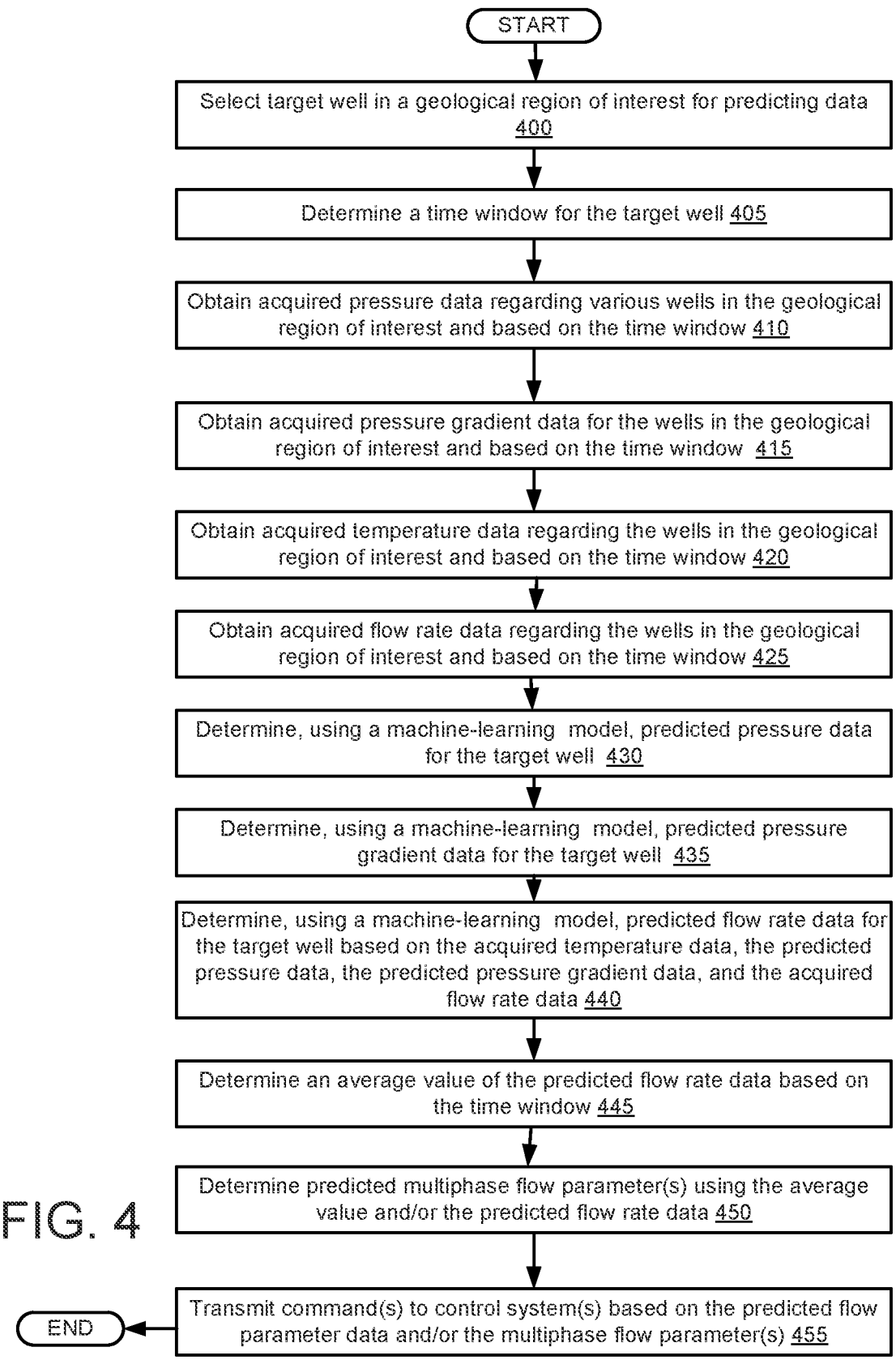
FIG. 4 shows a flowchart in accordance with one or more embodiments.

Turning to FIG. 4, FIG. 4 shows a flowchart in accordance with one or more embodiments. Specifically, FIG. 4 describes a general method for predicting flow rate data and/or multiphase flow parameters. One or more blocks in FIG. 4 may be performed by one or more components (e.g., reservoir simulator (160)) as described in FIGS. 1, 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a target well is selected in a geological region of interest for predicting data in accordance with one or more embodiments. A geological region of interest may be a portion of a geological area or volume that includes one or more wells or formations of interest desired or selected for further analysis, e.g., for determining a location of hydrocarbons or reservoir development purposes for a respective reservoir. As such, a geological region of interest may include one or more reservoir regions selected for running simulations. For example, the geological region of interest may be similar to geological region (200) or reservoir region (230) described above in FIG. 2 and the accompanying description.

In Block 405, a time window is determined for a target well in accordance with one or more embodiments. For example, upstream and downstream data may be collected for a specific period of time and at a specific sampling frequency. For example, upstream data may be acquired from a port on the flowline before a choke assembly by installing a gauge in that port and taking pressure and temperature data. Likewise, downstream data may be collected at the wellhead at or after the choke assembly. Data collected over this period of time may then be used to predict data for the target well, such as predicted pressure data, predicted pressure gradient data, predicted flow rate data, and/or predicted multiphase flow parameters. As such, the time window may be used to synchronize acquired data samples from multiple wells for predicting data for a target well.

In Block 410, acquired pressure data are obtained regarding various wells in a geological region of interest based on a time window in accordance with one or more embodiments. For example, shut-in bottom hole pressure (SBHP) data may be collected for various selected wells or all wells in a reservoir region with a target well. Thus, acquired pressure data may be used to determine datum pressure values for a target reservoir at a target well's location. In some embodiments, acquired pressure data is obtained for multiple well depths.

In Block 415, acquired pressure gradient data are obtained for various wells in a geological region of interest based on a time window in accordance with one or more embodiments. In particular, pressure gradient data may describe how pressure changes with respect to vertical depth at a particular well. In some embodiments, pressure gradient data corresponds to one or more hydrostatic pressure gradients that identify the rate of change in a particular formation fluid pressure based on depth. Likewise, pressure data may be acquired at two or more different depths in a reservoir, from which the pressure gradient of the fluid can be determined for various wells.

In Block 420, acquired temperature data are obtained regarding various wells in a geological region of interest and based on a time window in accordance with one or more embodiments. In some embodiments, pressure data and/or temperature data are acquired from wellhead sensors and/or flowline sensor disposed after a choke assembly on a well.

In Block 425, acquired flow rate data are obtained regarding various wells in a geological region of interest and based on a time window in accordance with one or more embodiments. For example, flow rate data may be acquired using a multiphase flowmeter or a separator with micromotion. Flow rate data may be acquired while acquiring upstream and downstream pressure and temperature data. Multiple data points per flow rate test may be used accordingly.

In Block 430, predicted pressure data are determined for a target well using a machine-learning model in accordance with one or more embodiments. In some embodiments, a K-nearest neighbors (k-NN) model is trained over various acquired datum pressures for various wells. For example, the acquired pressure data for an entire reservoir region or a portion of a reservoir region may be used to train the k-NN model. Afterwards, the k-NN model may be used to determined predicted pressure data for a target well. While a k-NN model is described here, other types of machine-learning models are also contemplated as described above in FIGS. 1-3 and the accompanying description.

In Block 435, predicted pressure gradient data are determined for a target well using a machine-learning model in accordance with one or more embodiments. In some embodiments, a K-nearest neighbors model is trained using acquired pressure gradients for various wells. Furthermore, these machine-learning models for determined predicted pressure data and predicted pressure gradient data may be updated frequently to reflect current changes in a reservoir region and among various selected wells that are the sources of acquired data.

In Block 440, predicted flow rate data are determined for a target well based on acquired temperature data, predicted pressure data, predicted pressure gradient data, and acquired flow rate data. In some embodiments, predicted pressure data and predicted pressure gradient data from two machine-learning models provide two inputs for a machine-learning model, such as an artificial neural network (ANN). Moreover, acquired flow rate data and temperature data (such as temperature gradient data) are used as additional inputs to the artificial neural network. Likewise, the artificial neural network may be trained over various acquired data. The artificial neural network may provide predicted flow rate data as an output.

In Block 445, an average value of the predicted flow rate data is determined based on a time window in accordance with one or more embodiments. In some embodiments, for example, predicted flow rate data is averaged for different flow rate parameter to determine a final predicted multiphase flow parameter value. Thus, the median or mean may be determined for predicted data within a time window in order to eliminate anomalies and noise.

In Block 450, one or more predicted multiphase flow parameters are determined using an average value and/or predicted flow rate data in accordance with one or more embodiments. For example, a predicted multiphase flow parameter may include a total flow rate, a gas-to-oil ratio (GOR), and/or a water cut (WC) value.

In Block 455, one or more commands are transmitted to one or more control systems based on predicted flow parameter data and/or one or more predicted multiphase flow parameters in accordance with one or more embodiments. For example, commands may be transmitted over a network connecting multiple well sites in order to optimize production of a reservoir region. Likewise, commands may include shut-off commands for terminating production at one or more wells, as well as commands to initiate production operations. In some embodiments, commands are used to trigger one or more stimulation operations, such as in response to a drop in hydrocarbon production at a target well.

In some embodiments, predicted flow rate data are used for real-time monitoring of well flow rates. Rather than switching wells from a production well to a testing well (e.g., by switching production well equipment to flow rate testing equipment in a gas-oil separation plant (GOSP)), a target well may be tested without shutting down the well. By using shut-in wells and other acquired well data sources, flow rate tests may be increased beyond specific daily and monthly testing capacities. Using machine learning, a target well may also avoid the need to install a multiphase flowmeter system (MPFM) on location, which may require significant maintenance. Likewise, a hybrid machine-learning architecture may provide early discovery of discrepancies between well rates under various testing conditions and that at production conditions due to back pressure.

Figure 5A:
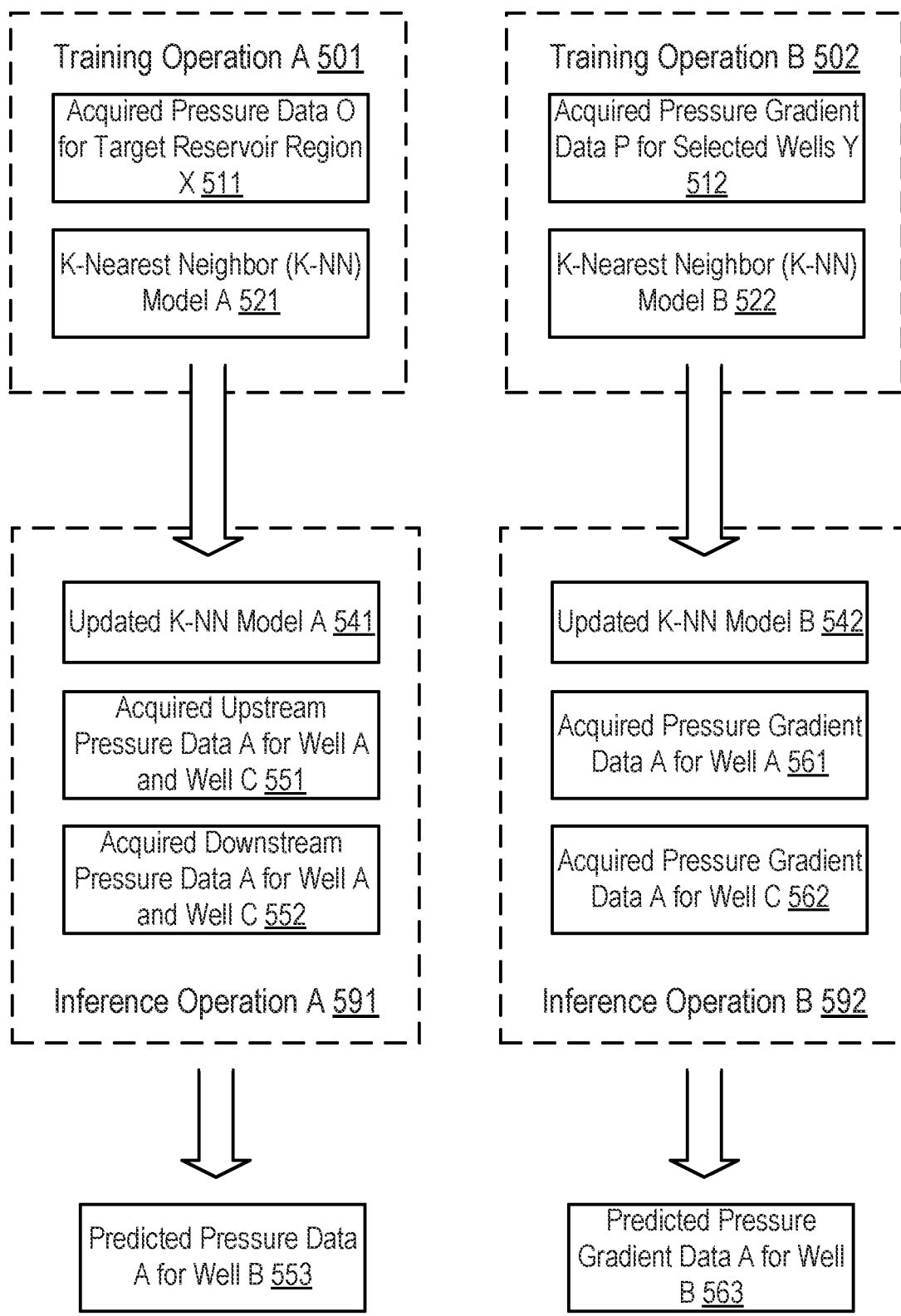
FIGS. 5A, 5B, 5C, 6A, 6B, and 6C show examples in accordance with one or more embodiments.
Figure 5B:
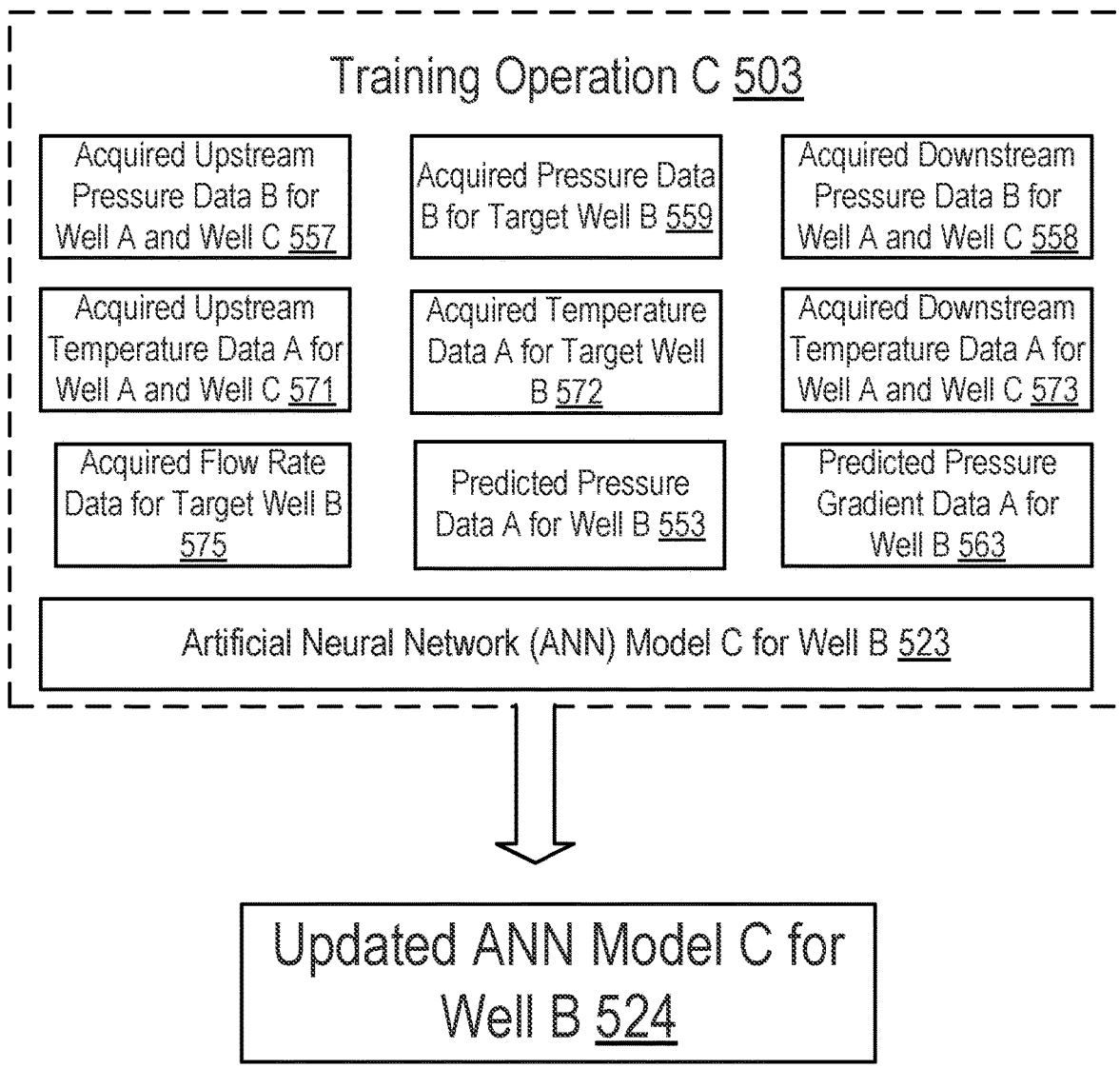
Figure 5C:
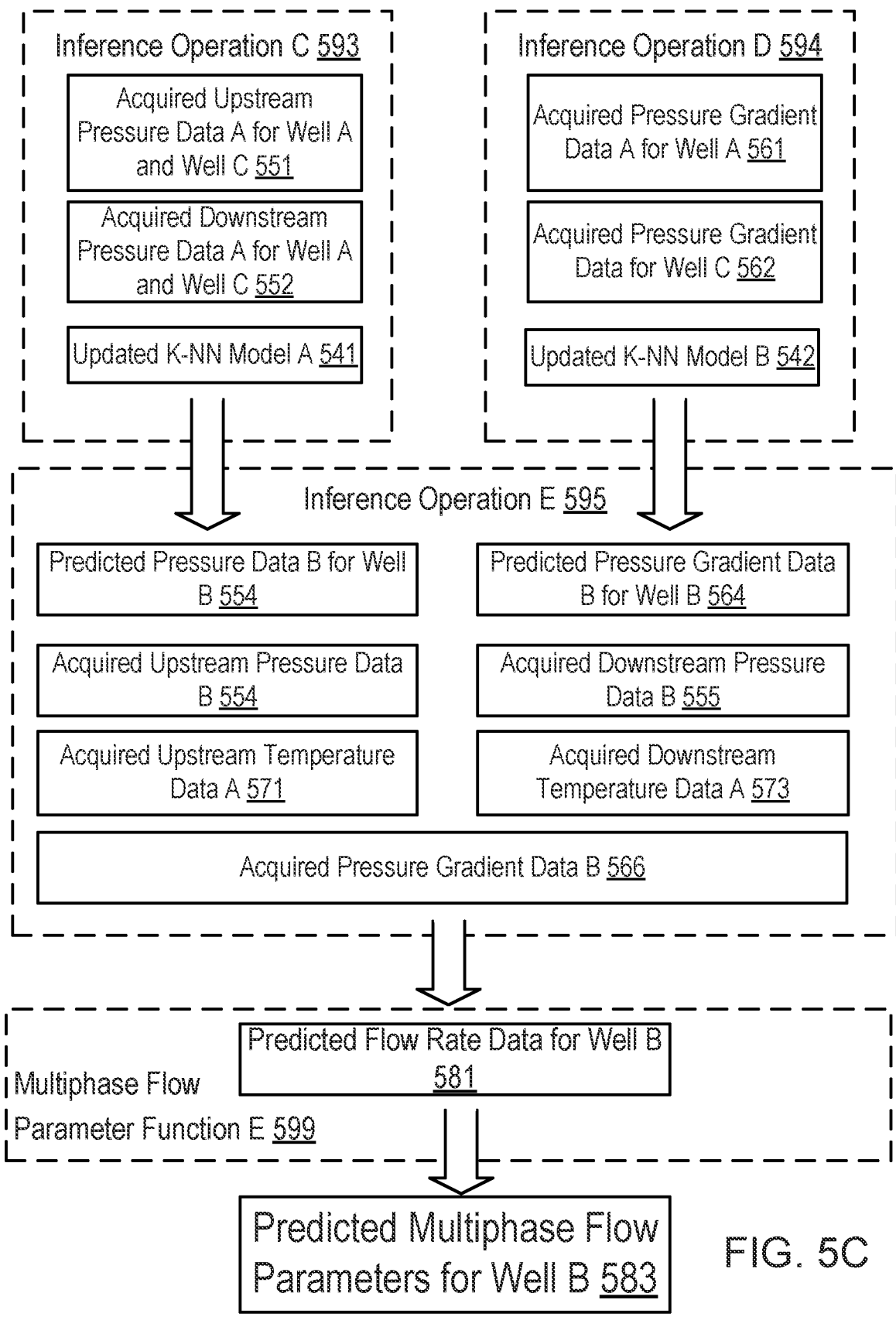

Turning to FIGS. 5A, 5B, and 5C, FIGS. 5A-5C provide an example of training multiple machine-learning models and performing prediction operations in accordance with one or more embodiments. The following example is for explanatory purposes only and not intended to limit the scope of the disclosed technology. As shown in FIG. 5A, a reservoir simulator (not shown) obtains acquired pressure data O (511) for a target reservoir region X (511) and acquired pressure gradient data P (512) for selected wells Y. While the acquired pressure data O (511) may include pressure data collected from wellhead sensors and downhole pressure sensors for all wells in the target reservoir region X, the acquired pressure gradient data P (512) may only be collected for certain wells and a target well B. Using the acquired pressure data O (511) as training data and testing data, the reservoir simulator performs a training operation A (501) on a K-Nearest Neighbor (k-NN) model A (521) to generate an updated k-NN model A (541). Likewise, the reservoir simulator also performs a training operation B (502) on the k-NN model B (522) to generate an updated k-NN model B (542). After the training operations (501, 502), the updated k-NN model A (541) may accurately predict pressure data for target well B, while the updated k-NN model B (542) may accurately predicted pressure gradient data for target well B.

Keeping with FIG. 5A, the reservoir simulator subsequently uses the updated k-NN model A (541) in an inference operation A (591) to determine predicted pressure data A (553) for target well B. In particular, the inference operation A (591) is performed using acquired upstream pressure data A (551) for well A and well C and acquired downstream pressure data A (552) for well A and well C as inputs to the updated k-NN model A (541) to determine predicted pressure data A (553). Moreover, the reservoir simulator performs an inference operation B (592) using acquired pressure gradient data A (561) for well A and acquired pressure gradient data A (562) for well C as inputs to determine predicted pressure gradient data A (563) for target well B.

Turning to FIG. 5B, the reservoir simulator performs a training operation C (503) of artificial neural network model C (523) using acquired pressure data (i.e., acquired upstream pressure data B (557) for well A and well C, acquired pressure data B (559) for target well B, and acquired downstream pressure data B (558) for well A and well C), acquired temperature data (i.e., acquired upstream temperature data A (571) for well A and well C, acquired temperature data A (572) for target well B, and acquired downstream temperature data A (573) for well A and well C), predicted data (i.e., predicted pressure data A (553) for target well B and predicted pressure gradient data A (563) for target well B), and acquired flow rate data (575) for target well B. Based on the training operation C (503), the ANN model C (523) is updated to produce updated ANN model C (524) that determines predicted flow rate data for target well B.

Turning to FIG. 5C, a reservoir simulator performs multiple inference operations (i.e., inference operation C (593), inference operation D (594), and inference operation E (595)) to determine predicted flow rate data (581) for target well B. First, the reservoir simulator performs inference operation C (593) using the updated k-NN model A (541) and acquired upstream pressure data A (551) for well A and well C and acquired downstream pressure data A (552) for well A and well C as inputs to determine predicted pressure data B (554) for target well B. Secondly, the reservoir simulator performs inference operation D (594) using the updated k-NN model B (542) and acquired pressure gradient data A (561) for well A and acquired pressure gradient data A (562) for well C as inputs to determine predicted pressure gradient data B (564) for target well B. Next, the reservoir simulator performs inference operation E (595) to determine predicted flow rate data (581) for target well B using predicted pressure data B (554), predicted pressure gradient data B (564), acquired pressure data B (554) for well A, acquired upstream pressure data B (555) for well A and well C, acquired pressure gradient data B (566) for well A, acquired downstream pressure gradient data B (567) for well A and well C, acquired upstream temperature data A (571) for well A and well C, and acquired downstream temperature data A (573) for well A and well C.

Keeping with FIG. 5C, the reservoir simulator applies a multiphase flow parameter function E (599) to the predicted flow rate data (581). In particular, the multiphase flow parameter function E (599) analyzes the predicted flow rate data (581) over a predetermined time window and determines one or more mean values of the predicted flow rate data. Using the one or more mean values, the reservoir simulator determines predicted multiphase flow parameters (583) for target well B, such as total flow rate, gas-oil ratios, and water cut values.

Figure 6A:
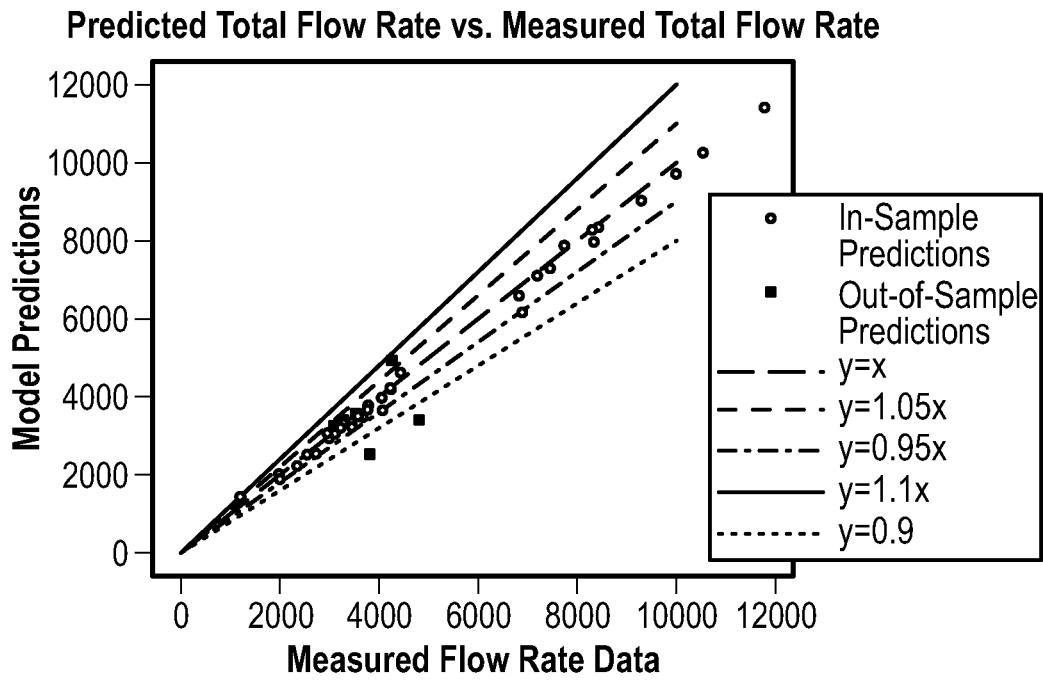
Figure 6B:
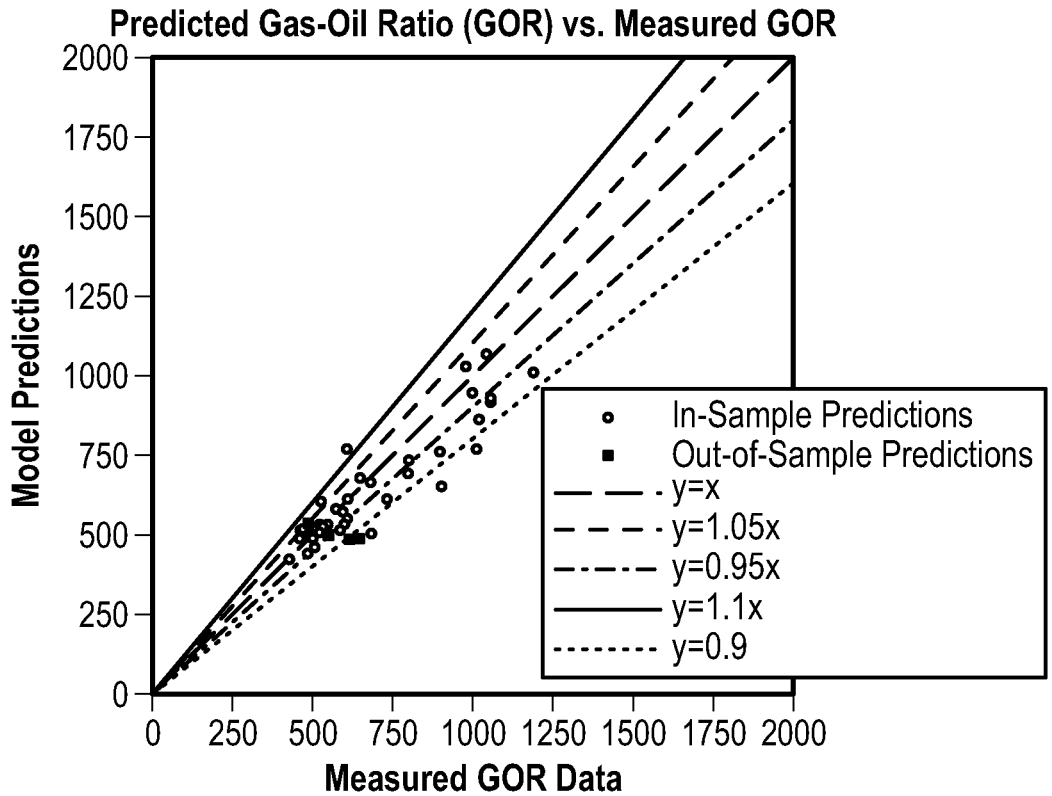
Figure 6C:
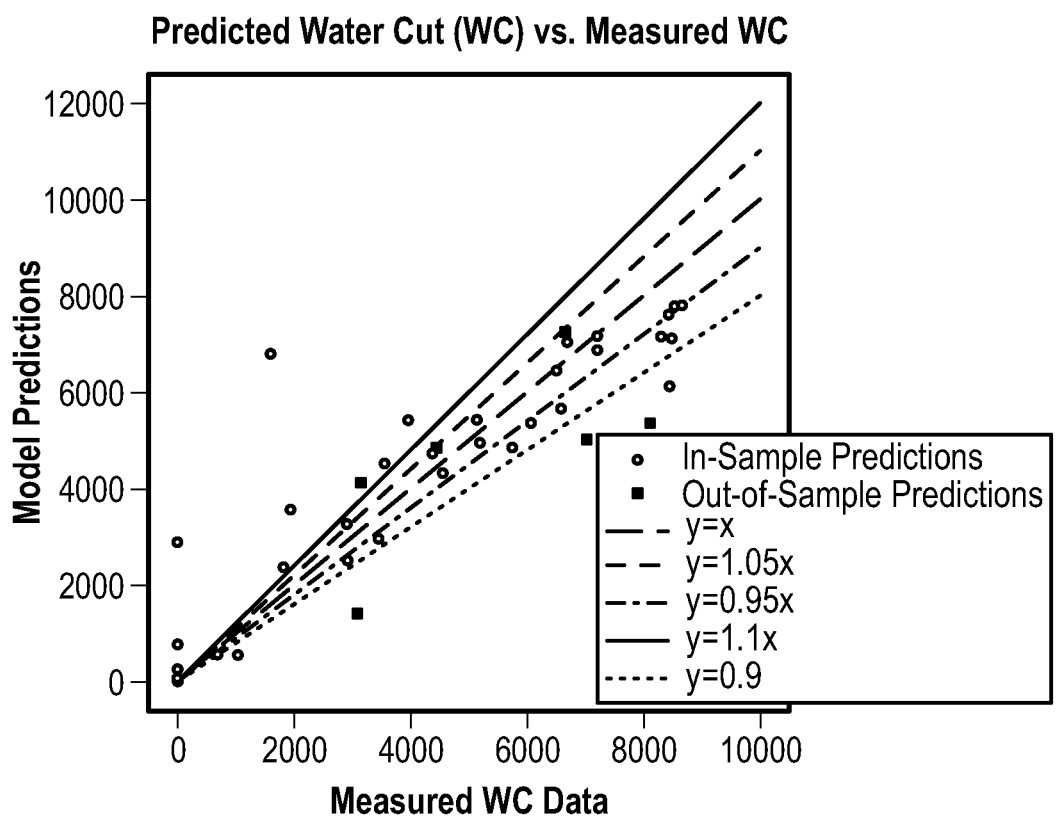

Turning to FIGS. 6A, 6B, and 6C, FIGS. 6A, 6B, and 6C show various example results of training various machine-learning models for predicting multiphase flow parameters. In FIG. 6A, FIG. 6A shows predicted total flow rates for a particular target well in comparison to actual flow rates measured at the target well. FIG. 6B illustrates predicted gas-oil ratios (GORs) and actual GORs for a target well. Likewise, FIG. 6C illustrates predicted water cut (WC) values and actual WC values for a target well. In FIGS. 6A-6C, the y=x line corresponds to a unity line that represent no error in predicted data with acquired data at the corresponding well. On the other hand, the other lines correspond to various errors rates between predicted and acquired data, such as lines y=0.95x and y=1.05 may define a band of 5% error in prediction.

Figure 7:
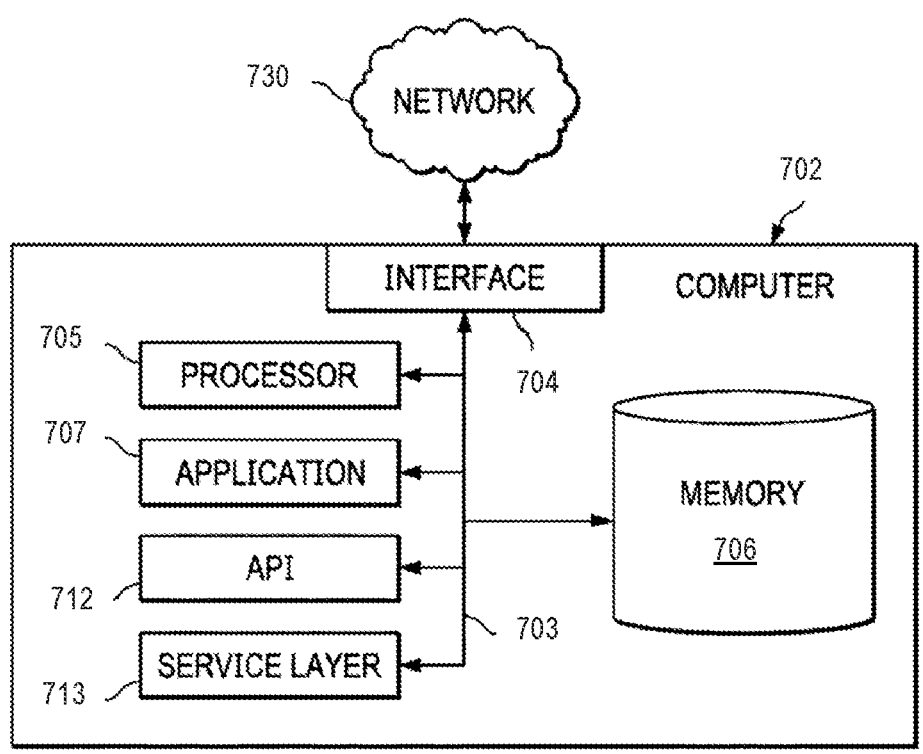
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. The illustrated computer (702) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single processor (705) in FIG. 7, two or more computer processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
    performing, by a well control system coupled to a wellhead comprising a first choke assembly and a production valve, a production operation that facilitates an extraction of hydrocarbons from a wellbore at a first well;
    obtaining, using a plurality of downhole pressure sensors disposed in a plurality of wells, first acquired pressure data for the plurality of wells in a geological region of interest;
    obtaining first acquired pressure gradient data for the plurality of wells, wherein the first acquired pressure gradient data corresponds to a pressure difference based on vertical depth at one or more wells among the plurality of wells;
    obtaining, using a plurality of downhole temperature sensors disposed in the plurality of wells first acquired temperature data regarding the plurality of wells;
    determining, by a computer processor, first predicted pressure data for the first well in the geological region of interest using a first k-nearest neighbor (K-NN) model and the first acquired pressure data, wherein the first K-NN model is based on a first non-parametric regression that uses a first plurality of neighbor nodes within the first acquired pressure data to output the first predicted pressure data;
    determining, by the computer processor, first predicted pressure gradient data for the first well using a second K-NN model and the first acquired pressure gradient data, wherein the second K-NN model is based on a second non-parametric regression that uses a second plurality of neighbor nodes within the first acquired pressure gradient data to output the first predicted pressure gradient data;
    determining, by the computer processor, predicted flow rate data for the first well using an artificial neural network, the first predicted pressure data, the first predicted pressure gradient data, and the first acquired temperature data,
        wherein the artificial neural network comprises an input layer, an output layer, and a plurality of hidden layers,
        wherein a respective hidden layer among the plurality of hidden layers comprises a plurality of neurons that combine a plurality of data inputs with a plurality of network weights for adjusting the plurality of data inputs,
        wherein the artificial neural network obtains the first predicted pressure data, the first predicted pressure gradient data, and the first acquired temperature data as inputs to the input layer, and
        wherein the predicted flow rate data is output from the output layer;
    determining, by the computer processor, one or more predicted multiphase flow parameters for the first well using the predicted flow rate data,
        wherein the one or more predicted multiphase flow parameters are selected from a group consisting of a gas-to-oil ratio of production at the first well, water cut data for the first well, and a total flow rate of the first well;
    transmitting, automatically by the computer processor, a command to the well control system based on the one or more predicted multiphase flow parameters; and
    performing, by the well control system, a shut-in operation at the first well that closes the first well in response to receiving the command based on the one or more predicted multiphase flow parameters.

2. The method of claim 1, further comprising:
obtaining training data comprising second acquired pressure data, second acquired pressure gradient data, second acquired temperature data;
obtaining acquired flow rate data regarding the first well, wherein the acquired flow rate data is acquired using a multiphase flowmeter;
performing a training operation of the artificial neural network using the training data and the acquired flow rate data to produce an updated artificial neural network; and
determining second predicted flow rate data for a second well using the updated artificial neural network, second predicted pressure data, second predicted pressure gradient data, and third acquired temperature data.

3. The method of claim 1, further comprising:
determining a time window for the first well that corresponds to a predetermined period of time and a predetermined frequency,
wherein the first acquired pressure data and the first acquired pressure gradient data correspond to pressure data that is acquired during the predetermined period of time; and
determining an average value of the predicted flow rate data; and
determining a predicted multiphase flow parameter based on the average value.

4. The method of claim 1,
wherein the plurality of wells comprises a second well and a third well,
wherein the second well comprises a second wellhead coupled to a first temperature sensor, a first pressure sensor, and a first flow rate sensor,
wherein the third well comprises a third wellhead coupled to a second temperature sensor, a second pressure sensor, and a second flow rate sensor,
wherein a portion of the first acquired temperature data is acquired by the first temperature sensor and the second temperature sensor, and
wherein a portion of the first acquired pressure data is acquired by the first pressure sensor and the second pressure sensor.

5. The method of claim 1,
wherein the first acquired pressure data comprises shut-in bottom hole pressure (SBHP) data.

6. The method of claim 1,
wherein the first acquired temperature data comprises upstream temperature data that is acquired by a first temperature sensor for a flow before a second choke assembly at a second well among the plurality of wells and downstream temperature data that is acquired by a second temperature sensor for a flow at or after the second choke assembly.

7. The method of claim 1,
wherein the first acquired pressure data comprises upstream pressure data that is acquired by a first pressure sensor for a flow before a second choke assembly at a second well among the plurality of wells and downstream pressure data that is acquired by a second pressure sensor at or after the second choke assembly at the second well.

8. A system, comprising:
a first well control system coupled to a first well;
a second well control system coupled to a second well;
a third well control system coupled to a third well,
wherein the third well control system is coupled to a wellhead comprising a choke assembly and a production valve, and
wherein the third well control system is configured to perform a production operation that facilitates an extraction of hydrocarbons from a wellbore at the third well; and
a reservoir simulator comprising a computer processor, wherein the reservoir simulator is coupled to the first well control system, the second well control system, and the third well control system, the reservoir simulator being configured to perform a method comprising:

obtaining, using a plurality of downhole pressure sensors disposed in the first well and the second well, first acquired pressure data for the first well and the second well;
obtaining first acquired pressure gradient data for the first well and the second well, wherein the first acquired pressure gradient data corresponds to a first pressure difference based on vertical depth at the first well and a second pressure difference based on vertical depth at the second well;
obtaining, using a plurality of downhole temperature sensors disposed in the first well and the second well, first acquired temperature data regarding the first well and the second well;
determining first predicted pressure data for the third well in a geological region of interest using a first k-nearest neighbor (K-NN) model and the first acquired pressure data, wherein the first K-NN model is based on a first non-parametric regression that uses a first plurality of neighbor nodes within the first acquired pressure data to output the first predicted pressure data;
determining first predicted pressure gradient data for the third well using a second K-NN model and the first acquired pressure gradient data, wherein the second K-NN model is based on a second non-parametric regression that uses a second plurality of neighbor nodes within the first acquired pressure gradient data to output the first predicted pressure gradient data;
determining predicted flow rate data for the third well using an artificial neural network, the first predicted pressure data, the first predicted pressure gradient data, and the first acquired temperature data,
wherein the artificial neural network comprises an input layer, an output layer, and a plurality of hidden layers,
wherein a respective hidden layer among the plurality of hidden layers comprises a plurality of neurons that combine a plurality of data inputs with a plurality of network weights for adjusting the plurality of data inputs,
wherein the artificial neural network obtains the first predicted pressure data, the first predicted pressure gradient data, and the first acquired temperature data as inputs to the input layer, and
wherein the predicted flow rate data is output from the output layer;
determining one or more predicted multiphase flow parameters for the third well using the predicted flow rate data,
wherein the one or more predicted multiphase flow parameters are selected from a group consisting of a gas-to-oil ratio of production at the third well, water cut data for the third well, and a total flow rate of the third well; and
automatically transmitting a command to the third well control system based on the one or more predicted multiphase flow parameters,
wherein the third well control system is configured to perform a shut-in operation at the third well that closes the third well in response to receiving the command based on the one or more predicted multiphase flow parameters.

9. The system of claim 8, wherein the reservoir simulator is further configured to:

obtain training data comprising second acquired pressure data, second acquired pressure gradient data, second acquired temperature data;

obtain acquired flow rate data regarding the third well, wherein the acquired flow rate data is acquired using a multiphase flowmeter;

perform a training operation of the artificial neural network using the training data and the acquired flow rate data to produce an updated artificial neural network; and determine second predicted flow rate data for a second well using the updated artificial neural network, second predicted pressure data, second predicted pressure gradient data, and third acquired temperature data.

10. The system of claim 8, wherein the reservoir simulator is further configured to:

determine a time window for the third well that corresponds to a predetermined period of time and a predetermined frequency, wherein the first acquired pressure data and the first acquired pressure gradient data correspond to pressure data that is acquired during the predetermined period of time; and determine an average value of the predicted flow rate data; and determining a predicted multiphase flow parameter based on the average value.

11. A non-transitory computer readable medium storing instructions executable by a computer processor, the instructions when executed by the computer processor are configured to perform a method comprising:

obtaining, using a plurality of downhole pressure sensors disposed in a plurality of wells, first acquired pressure data for the plurality of wells in a geological region of interest;

obtaining first acquired pressure gradient data for the plurality of wells, wherein the first acquired pressure gradient data corresponds to a pressure difference based on vertical depth at one or more wells among the plurality of wells;

obtaining, using a plurality of downhole temperature sensors disposed in the plurality of wells first acquired temperature data regarding the plurality of wells;

determining first predicted pressure data for a first well in the geological region of interest using a first k-nearest neighbor (K-NN) model and the first acquired pressure data, wherein a production operation is performed at the first well by a well control system that facilitates an extraction of hydrocarbons from a wellbore, and wherein the first K-NN model is based on a first non-parametric regression that uses a first plurality of neighbor nodes within the first acquired pressure data to output the first predicted pressure data;

determining first predicted pressure gradient data for the first well using a second K-NN model and the first acquired pressure gradient data, wherein the second K-NN model is based on a second non-parametric regression that uses a second plurality of neighbor nodes within the first acquired pressure gradient data to output the first predicted pressure gradient data;

determining predicted flow rate data for the first well using an artificial neural network, the first predicted pressure data, the first predicted pressure gradient data, and the first acquired temperature data, wherein the artificial neural network comprises an input layer, an output layer, and a plurality of hidden layers, wherein a respective hidden layer among the plurality of hidden layers comprises a plurality of neurons that combine a plurality of data inputs with a plurality of network weights for adjusting the plurality of data inputs, wherein the artificial neural network obtains the first predicted pressure data, the first predicted pressure gradient data, and the first acquired temperature data as inputs to the input layer, and wherein the predicted flow rate data is output from the output layer;

determining one or more predicted multiphase flow parameters for the first well using the predicted flow rate data, wherein the one or more predicted multiphase flow parameters are selected from a group consisting of a gas-to-oil ratio of production at the first well, water cut data for the first well, and a total flow rate of the first well; and automatically transmitting a command to the well control system based on the one or more predicted multiphase flow parameters, wherein a shut-in operation is performed at the first well that closes the first well in response to receiving the command based on the one or more predicted multiphase flow parameters.

12. The non-transitory computer readable medium of claim 11, wherein the method further comprises:

obtaining training data comprising second acquired pressure data, second acquired pressure gradient data, second acquired temperature data;

obtaining acquired flow rate data regarding the plurality of wells, wherein the acquired flow rate data is acquired using a plurality of multiphase flowmeters;

performing a training operation of the artificial neural network using the training data and the acquired flow rate data to produce an updated artificial neural network; and determining second predicted flow rate data for a second well using the updated artificial neural network, second predicted pressure data, second predicted pressure gradient data, and third acquired temperature data.

* * * * *